United States Patent
Wertz et al.

(10) Patent No.: US 6,900,162 B2
(45) Date of Patent: May 31, 2005

(54) SLOW RELEASE NITROGEN COATING

(75) Inventors: Stacey L. Wertz, Conyers, GA (US);
Kurt Gabrielson, Lilburn, GA (US);
James Knight, Conyers, GA (US);
Paul Baxter, Conyers, GA (US); C. R. Davis, Conyers, GA (US); James C. Phillips, Peachtree City, GA (US);
Pablo Dopico, Conyers, GA (US);
Robbie D. Kelly, Tyrone, GA (US);
Richard Rediger, Conyers, GA (US);
Michael J. Aron, Snellville, GA (US)

(73) Assignee: Georgia-Pacific Resins, Inc., Atlanta, CA (US)

( * ) Notice: Subject to any disclaimer, the term of this patent is extended or adjusted under 35 U.S.C. 154(b) by 29 days.

(21) Appl. No.: 10/396,702

(22) Filed: Mar. 26, 2003

(65) Prior Publication Data

US 2004/0023809 A1 Feb. 5, 2004

Related U.S. Application Data

(60) Provisional application No. 60/367,278, filed on Mar. 26, 2002, and provisional application No. 60/379,402, filed on May 13, 2002.

(51) Int. Cl.[7] .............................. A01N 25/10; C05C 9/02
(52) U.S. Cl. ....................... 504/367; 424/417; 424/497; 71/64.01
(58) Field of Search ........................ 504/367; 71/64.01; 424/417, 497

(56) References Cited

U.S. PATENT DOCUMENTS

| | | |
|---|---|---|
| 2,648,609 A | 8/1953 | Wurster |
| 2,986,840 A | 6/1961 | Rogers |
| 2,999,336 A | 9/1961 | Cescas |
| 3,316,676 A | 5/1967 | Legal, Jr. et al. |
| 3,438,764 A | 4/1969 | Church |
| 3,598,565 A | 8/1971 | Graves |
| 3,621,612 A | 11/1971 | Porter |
| 3,677,736 A | 7/1972 | Formalni |
| 3,707,807 A | 1/1973 | Graves |
| 3,713,800 A | 1/1973 | Karnemaat |
| 3,808,740 A | 5/1974 | Porter et al. |
| 3,905,152 A | 9/1975 | Loperfido |
| 3,911,183 A | 10/1975 | Hinkes |

(Continued)

FOREIGN PATENT DOCUMENTS

| | | |
|---|---|---|
| DE | 43 08 505 A1 | 9/1994 |
| EP | 1 288 179 A1 | 5/2003 |
| GB | 2 229 350 A | 9/1990 |
| JP | 50 40321 | 4/1975 |
| JP | 3-22905 | 1/1991 |

OTHER PUBLICATIONS

Copy of specification "Slow Release Nitrogen Fertilizer" (22 pgs.) claiming benefit of provisional applications 60/367,278 filed Mar. 26, 2002 and 60/379,402 filed May 13, 2002.
International Search Report dated Nov. 13, 2003.
International Search Report dated Oct. 2, 2003.
International Search Report dated Aug. 8, 2003.
Porter, F.E., Chemtech, May 1978, pp. 284–287.
Ros, C., et al., Seed Sci. & Technolo., 28: pp. 391–401, 2000.
J.E. Matocha, "*Effect of Seed Coating Protectants on Iron Deficiency Chlorosis and Sorghum Plant Growth*", Journal of Plant Nutrition, 15(10), 2007–2013 (1992).

*Primary Examiner*—S. Mark Clardy
(74) *Attorney, Agent, or Firm*—Banner & Witcoff, Ltd.

(57) ABSTRACT

A coated aggregate material for enhancing the extended delivery of nitrogen needed for plant development and growth, the coated aggregate material having a slow release (extended-release) nitrogen coating of a particulate UF polymer adhered to the aggregate material with an adhesive binder.

23 Claims, 1 Drawing Sheet

U.S. PATENT DOCUMENTS

| | | |
|---|---|---|
| 3,981,845 A | 9/1976 | Renner |
| 4,025,329 A | 5/1977 | Goertz |
| 4,058,067 A | 11/1977 | Wright et al. |
| 4,066,490 A | 1/1978 | Yoshimi |
| 4,089,899 A | 5/1978 | Greidinger et al. |
| 4,120,685 A | 10/1978 | Vargiu et al. |
| 4,174,957 A | 11/1979 | Webb et al. |
| 4,190,981 A | 3/1980 | Muldner |
| 4,192,095 A | 3/1980 | Haslam et al. |
| 4,219,966 A | 9/1980 | McCalister |
| 4,245,432 A | 1/1981 | Dannelly |
| 4,249,343 A | 2/1981 | Dannelly |
| 4,251,952 A | 2/1981 | Porter et al. |
| 4,280,830 A | 7/1981 | Ferguson et al. |
| 4,298,512 A | 11/1981 | Sartoretto et al. |
| 4,333,265 A | 6/1982 | Arnold |
| 4,357,780 A | 11/1982 | Ball |
| 4,378,238 A | 3/1983 | Goertz |
| 4,409,015 A | 10/1983 | Grace, Jr. |
| 4,410,685 A | 10/1983 | Williams |
| 4,411,683 A | 10/1983 | Goertz |
| 4,429,075 A | 1/1984 | Carlson |
| 4,474,925 A | 10/1984 | Sartoretto et al. |
| 4,493,725 A | 1/1985 | Moon et al. |
| 4,501,851 A | 2/1985 | Williams |
| 4,526,606 A | 7/1985 | Formaini |
| 4,530,713 A | 7/1985 | Williams |
| 4,575,391 A | 3/1986 | DeBoodt et al. |
| 4,578,105 A | 3/1986 | Moore |
| 4,596,593 A | 6/1986 | Tazawa et al. |
| 4,735,015 A | 4/1988 | Schmolka |
| 4,735,017 A | 4/1988 | Gago et al. |
| 4,752,317 A | 6/1988 | Detroit |
| 4,753,035 A | 6/1988 | Ryan et al. |
| 4,756,738 A | 7/1988 | Detroit |
| 4,780,988 A | 11/1988 | Mielke et al. |
| 4,789,391 A | 12/1988 | Detroit |
| 4,832,728 A | 5/1989 | Allan et al. |
| 4,906,276 A | 3/1990 | Hughes |
| 4,960,856 A | 10/1990 | Formaini |
| 4,997,469 A | 3/1991 | Moore |
| 5,022,182 A | 6/1991 | Anderson |
| 5,039,328 A | 8/1991 | Saitoh et al. |
| 5,043,007 A | 8/1991 | Davis |
| 5,044,116 A | 9/1991 | Gago et al. |
| 5,106,648 A | 4/1992 | Williams |
| 5,110,898 A | 5/1992 | Formaini |
| 5,262,381 A | 11/1993 | Tuséet al. |
| 5,266,097 A | 11/1993 | Moore |
| 5,300,127 A | 4/1994 | Williams |
| 5,317,834 A | 6/1994 | Anderson |
| 5,344,471 A | 9/1994 | Tuséet al. |
| 5,443,637 A | 8/1995 | Long, Jr. et al. |
| 5,494,709 A | 2/1996 | Long, Jr. et al. |
| 5,501,720 A | 3/1996 | Buchholz |
| 5,618,330 A | 4/1997 | Artozon Sylvester |
| 5,640,803 A | 6/1997 | Kloepper et al. |
| 5,674,971 A | 10/1997 | Graves |
| 5,797,976 A | 8/1998 | Yamashita |
| 5,849,060 A * | 12/1998 | Diping et al. ............... 71/64.07 |
| 5,849,320 A | 12/1998 | Turnblad et al. |
| 5,860,245 A | 1/1999 | Welch |
| 5,935,839 A | 8/1999 | Kloepper et al. |
| 5,935,909 A | 8/1999 | Sanders |
| 6,009,663 A | 1/2000 | Kazemzadeh |
| 6,022,827 A | 2/2000 | Kumar et al. |
| 6,048,378 A | 4/2000 | Moore |
| 6,058,649 A | 5/2000 | Bittman et al. |
| 6,088,957 A | 7/2000 | Kazemzadeh |
| 6,202,346 B1 | 3/2001 | Lyons et al. |
| 6,209,259 B1 | 4/2001 | Madigan et al. |
| 6,230,438 B1 | 5/2001 | Zaychuk et al. |
| 6,254,655 B1 * | 7/2001 | Goertz ......................... 71/28 |
| 6,306,194 B1 | 10/2001 | Wertz et al. |
| 6,309,440 B1 | 10/2001 | Yamashita |
| 6,318,023 B1 | 11/2001 | Yamashita |
| 6,432,156 B1 | 8/2002 | O'Donnell, Sr. |
| 6,464,746 B2 | 10/2002 | Neyman et al. |
| 6,515,177 B1 | 2/2003 | O'Donnell, Sr. |
| 2002/0103086 A1 | 8/2002 | Asrar et al. |
| 2002/0134012 A1 | 9/2002 | Ding et al. |
| 2002/0139046 A1 | 10/2002 | Weber et al. |
| 2003/0220200 A1 | 11/2003 | Wertz et al. |
| 2003/0228981 A1 | 12/2003 | Wertz et al. |

* cited by examiner

SLOW RELEASE NITROGEN COATING

This application claims the benefit of provisional application 60/367,278 filed Mar. 26, 2002 and Provisional application 60/379,402 filed May 13, 2002.

FIELD OF THE INVENTION

The present invention relates to a coating to be applied to an aggregate material for enhancing the extended delivery of nitrogen needed for plant development and growth. The invention specifically relates to a coated aggregate material having a particulate source of slow release nitrogen in the coating and to the use of the coated aggregate material as a means for delivering nutrient nitrogen over an extended period of time to a plant for enhancing plant development and growth.

BACKGROUND OF THE INVENTION

Through the years, a variety of techniques have been developed for delivering nutrients to growing plants and for extending or delaying the release of nutrients from a fertilizer.

In one approach, a granular or particulate fertilizer is formed which gradually releases its components to the environment. The rate of release of nutrients from the fertilizer particles is influenced by the composition of the particulate fertilizer, often by the way the fertilizer composition has been granulated or by nature of the binder used to assist granulation of the fertilizer.

In another approach, a slow or delayed release coating is applied over the granular fertilizer. Such coatings have included sulfur, waxes and resins. U.S. Pat. No. 4,019,890, for example, describes completely coating a granular fertilizer using a solution of a highly water resistant resin. The patent teaches the use of a solution of a thermoplastic resin, such as a polyolefin, in a hydrocarbon or chlorinated hydrocarbon solvent, which is rapidly dried upon spaying onto the fertilizer granules. U.S. Pat. No. 4,881,963 also describes a coating for a granular fertilizer, the coating comprising an ethylene-carbon monoxide copolymer and optionally one resin selected from either a rubbery resin, such as natural rubber, polyisoprene or SBR, or an ethylene-vinyl acetate copolymer.

Related technologies also are described in AU 704,560, JP 9249478 and JP 9309783.

In these approaches, the coating itself generally has little to no nutrient value and functions solely to regulate the release of nutrients from the encapsulated granular fertilizer.

Nitrogen fertilizer is often applied as a formulated (N—P—K) solid, granular or powder, or sometimes as a liquid to an area to be fertilized. The solid form is generally fast release, but it can be made slow release by various coatings (as described above). Alternatively, a reduction in nitrogen availability also can be obtained by using enzyme inhibitors. The liquid form may include both fast-acting and slow release forms of nitrogen. Some of the recognized disadvantages of such nitrogen fertilization involve run-off into rivers and streams, ammonia emissions and nitrate leaching.

The prior art does not describe how to introduce a particulate source of slow release nitrogen using a coating on a solid support, or on an aggregate material, as a way to deliver the nitrogen over a prolonged period of time for enhancing plant development and growth and for minimizing the problems of run-off and ammonia emission associated with many of the common forms of nitrogen fertilization. The present invention proposes to supply a particulate slow-release nitrogen fertilizer as a coating on a solid substrate or on an aggregate material.

BRIEF DESCRIPTION OF THE DRAWINGS

The sole FIGURE is a graph showing the lysimeter results (nitrogen release rate) over a six (6) month time period for the UF polymer powder of the present invention and several commercially available sources of nitrogen fertilizers.

DETAILED DESCRIPTION OF THE INVENTION

Figure 1:
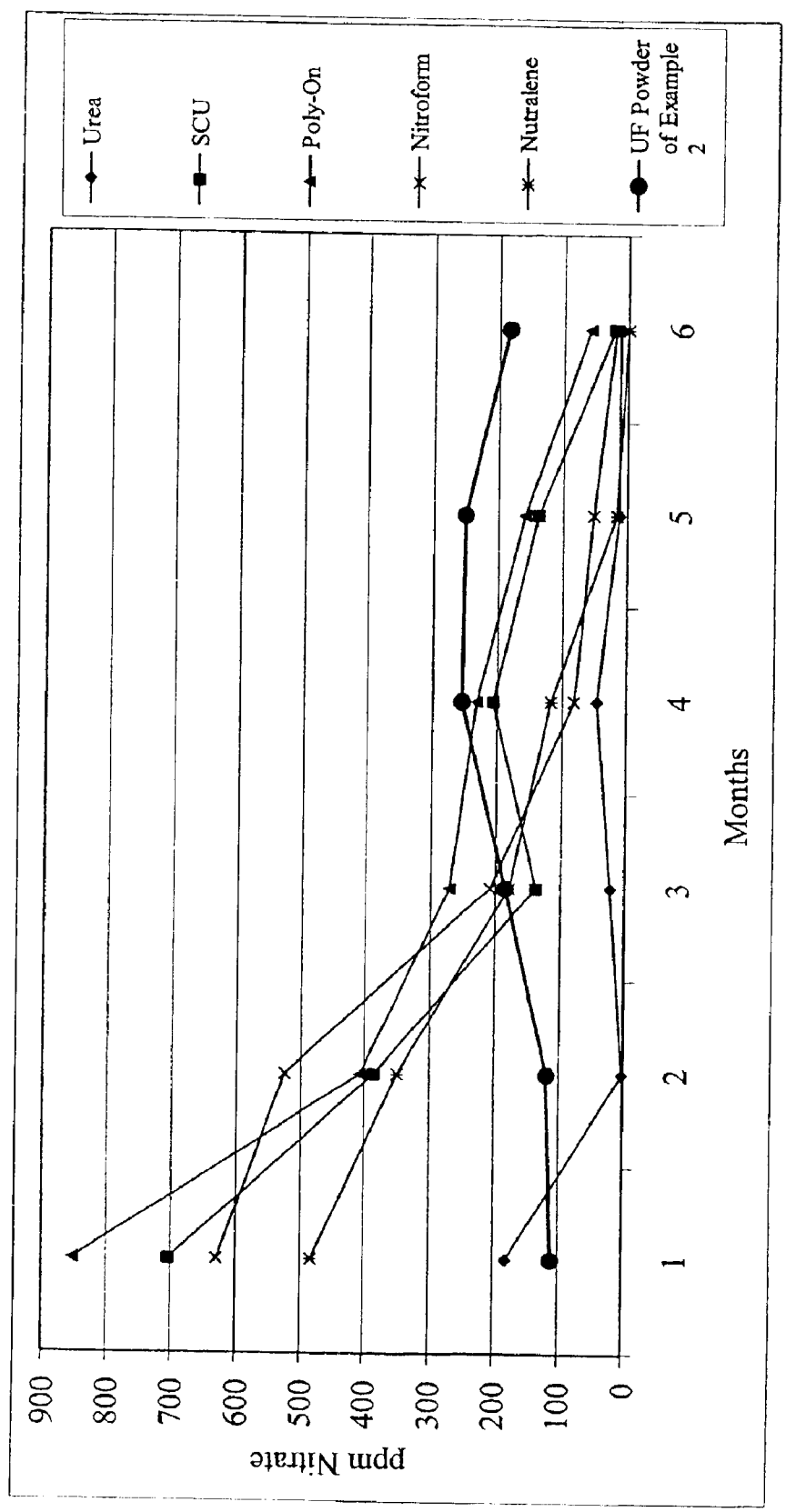

As noted above, the present invention is directed to a coated aggregate material for providing an extended delivery of nitrogen needed for plant development and growth. The aggregate material is used in a way which brings it into proximity with a developing or growing plant, such as grass, an ornamental shrub, a tree and the like.

The present invention specifically relates to a coated aggregate material coated with a composition containing slow release nitrogen particles and to the use of the coated aggregate material for enhancing plant development and growth by placing the coated aggregate in the proximity of a plant which benefits from the nitrogen slowly released from the coating. The slow release nitrogen particles are adhered to the surface of the aggregate material with an adhesive binder formulation. The binder can be one that is easily degraded by soil moisture, or can be one that resists degradation as a way of further extending the release of the nitrogen.

As used throughout this application and in the claims, the terms "aggregate," "aggregate material," "solid substrate" and similar phrases are intended to embrace a variety of relatively small solid particulates that are commonly placed in close proximity with growing plants. In particular, these terms are intended to embrace such varied materials as sand, which often is used in golf course maintenance for filling in divots and as a top coating or top dressing, such as on greens; granular (often inorganic) fertilizers, but including solid forms of urea; wood bark, wood chips and sawdust, often used in preparing a mulch and for mulching around trees and ornamental bushes and shrubs; marble chips and other decorative stones, often used around the base of plants to retard the growth of weeds; and particulate natural nitrogenous materials, as that term is defined and described in U.S. Pat. Nos. 4,997,469; 5,021,077 and 5,240,490, each of which is incorporated herein by reference, which natural nitrogenous materials can be used as a particulate fertilizer.

As used throughout the specification and in the claims, the term "proximity" and related terms of equal import are intended to mean that the coated aggregate is located sufficiently close to a growing plant, such as grasses, bushes, shrubs and trees, that the nitrogen, which is made available by microorganisms, principally bacteria, enzymatically (e.g., using urease and nitrogenase) degrading the nitrogen-based polymer that comprises the particulate source of slow release nitrogen used in the coating, into a form useable by the growing plant, can reach and be used by the growing plant.

A key constituent of the present invention is slow release nitrogen, urea-formaldehyde (UF) polymer particles. These particles constitute the source of extended release nitrogen of the coated aggregate material of the present invention.

The slow release nitrogen UF polymer particles used in the present invention are prepared by reacting, in an aqueous environment, urea and formaldehyde at a urea:formaldehyde mole ratio of about 1:1. Ammonia may be an optional reactant, as will be understood by those skilled in the art, in an amount of up to about 25% by weight of the formed UF polymer, usually in an amount below about 10% by weight, but in the preferred embodiment of the present invention ammonia is not used at all.

To prepare the UF polymer particles of the present invention, urea and formaldehyde are reacted in admixture at a mole ratio of approximately 1:1, for example at a UF mol ratio broadly in the range of $0.7:1 \leq U:F \leq 1.25:1$ and more preferably in the range of $0.83:1 \leq U:F \leq 1.1:1$. The phrase "at a mole ratio of approximately 1:1" is intended to embrace these mole ratio ranges. Particularly good results have been obtained at a U:F mole ratio between 0.95:1 and 1.05:1.

In the initial step of preparing the UF polymer particles, reaction between urea and formaldehyde is conducted in a manner to produce methylol ureas. Methods of doing this are well known to those skilled in the art and any of such known methods can be used. For example, reaction between the urea and formaldehyde can be promoted by maintaining the aqueous mixture initially at a moderate alkaline pH, with a pH in the range of about 7 to 9 being suitable and with a pH more usually between about 7.5 and 8.5, to promote the formation of the methylol ureas. Given urea's inherent level of alkalinity, any required pH adjustment may be accomplished using either an acid or a base. The initial formation of methyol ureas generally can be conducted at a reaction temperature broadly in the range of 70° F. to 175° F. (about 20° C. to about 80° C.), with a reaction temperature in the range of 90° F. to 160° F. (about 30° C. to about 70° C.) more usually employed. The pH may be adjusted using commonly available acids and bases such as sodium hydroxide (caustic) and sulfuric acid. The reaction also may be maintained (buffered) or adjusted by adding such alkaline compounds as triethanolamine, sodium or potassium bicarbonate, sodium or potassium carbonate, or other alkali metal hydroxides, such as potassium hydroxide and lithium hydroxide. Alternatively (though not generally preferred), the methylolation may also be done at an acidic pH, such as in the pH range of 5.0 to 6.0, as will be recognized by those skilled in the art and the present invention is not limited by the way the initial methylolation is conducted.

Following the initial formation of methylol ureas, the nascent UF polymer then is condensed to the point where the polymer becomes insoluble in the aqueous environment. This result is preferably accomplished by rapidly acidifying the methylol ureas, to a pH below about 6, preferably below about 5 and usually to a pH below about 4, but above about 1. A pH in the range of 2.5 to 4.0 has proven to be suitable. Any organic or inorganic acid that will lower the pH can be used. Particularly suitable is a strong acid, such as a mineral acid and an organic acid such as the stronger carboxylic acids. Thus, suitable acids include formic acid, acetic acid, nitric acid, phosphoric acid, sulfuric acid and hydrochloric acid. However, in its broadest aspects the present invention is not limited by the way the further polymerization of the methylol ureas and ultimate insolubilization is conducted and obtained.

In order to produce a useful range of UF polymer particle sizes, the aqueous mixture of the methylol ureas is preferably mixed or agitated in the presence of a dispersing agent during the acidification step, although it should be possible to get a similar result by maintaining a sufficiently high level of agitation during the reaction in the absence of any dispersing agent. The resulting dispersion of UF polymer particles formed from the polymerization that occurs, for example, following acidification, can then be used directly (possibly following some thickening, or concentration enrichment), i.e., as a dispersion, to coat an aggregate, or alternately can be recovered or isolated from the dispersion to produce a UF polymer powder, which then is used to formulate the coating. In any event, the UF particulates formed in this manner have approximately 36% nitrogen.

Particularly in the preferred embodiment, most of the nitrogen in the UF particles is chemically bound in the UF polymer particulates and thus is agronomically unavailable until microorganisms, principally bacteria, enzymatically (e.g., using urease and nitrogenase) degrade the polymer into a form useable by the growing plant. It is this property that leads to labeling the UF polymer "slow release" or "extended release." A small amount of the nitrogen, typically on the order of 5% by weight of the particulate, may be of the fast or quick release variety (e.g., principally unreacted urea) and thus may be immediately available to a developing plant. Because the UF polymer has only about 5% quick release nitrogen, however, the chance of over fertilization using the preferred coated aggregate material of the present invention is minimal. However, if desired, the reaction conditions (including the mole ratio of reactants) and/or the extent of the reaction also can be adjusted such that a higher amount of free urea is present in the UF particles, as a way to deliver more immediately available nitrogen for a quicker initial greening effect. Such adjustments are well within the skill of the art in view of the present disclosure.

Skilled practitioners recognize that the formaldehyde and urea reactants used to make the UF polymer of this invention are commercially available in many forms. Any form of these materials, which can react with the other reactant and which does not introduce extraneous moieties deleterious to the desired reaction and reaction product, can be used in the preparation of the slow release nitrogen, urea-formaldehyde polymer particles of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used sources of formaldehyde. Formaldehyde also may be available as a gas. Each of these sources of formaldehyde is suitable for use in the preparing the UF polymer of this invention. Generally, for ease of use, formalin solutions are preferred as the formaldehyde source. In addition, some of the formaldehyde may be replaced with another aldehyde, such as acetaldehyde and/or propylaldehyde which can react with urea. Glyoxal may also be used in place of formaldehyde, as may other aldehydes not specifically enumerated.

Urea also is available in many forms. Solid urea, such as prill, and urea solutions, typically aqueous solutions, are commercially available. Further, urea often is chemically combined with formaldehyde in the form of a urea-formaldehyde concentrate, such as UFC 85, or as a commercially-available solution containing about 25 weight percent urea, about 60 weight percent formaldehyde, and about 15 weight percent water, available under the trademark STA-FORM 60.® Each of these sources of urea can be used in preparing the UF polymer of this invention.

The urea-formaldehyde condensation reaction that results in the UF polymer particles of this invention is preferably conducted in an aqueous environment. As noted above, the reaction is conducted until the growing urea-formaldehyde polymer becomes insoluble in the aqueous, reaction medium. A dispersing agent is preferably included in the water to facilitate the production of small polymer particles by the reaction. One suitable dispersant is the line of DAXAD dispersants commercially available from Hampshire Chemicals, a subsidiary of the Dow Chemical Company. One of the classes of these dispersants is a condensed naphthalene sulfonate. Both the high and low molecular weight species of this product line have been shown to be suitable, such as DAXDAD 19. A variety of other dispersants, or surfactants also can be used, including those that might be classified as anionic, such as polyacrylates (also available under the DAXAD label—such as DAXAD 30 from Hampshire Chemicals). Nonionic and cationic dispersant compounds also can be used. Suitable alternative materials can be identified using routine experimentation. The nature of the specific dispersant/surfactant one uses is not critical. Another example would be a lignosulfonate salt or lignin. It is also possible to dispense with the use of any dispersant, provided that the reaction medium is sufficiently agitated (high shear) during the UF condensation reaction to promote the formation of small polymer particles.

The amount of dispersant to include in the aqueous solution of methylol urea at the time of the insolubilization reaction can be readily determined by those skilled in the art. The amount depends to some extent on the particular dispersant chosen to use and the concentration of methylol urea in the aqueous reaction medium. Generally, the urea and formaldehyde reactants and the water vehicle are provided in amounts to yield a methylol urea concentration that ultimately provides a dispersion of UF polymer particles at about a 20% by weight solid concentration up to about 60% by weight solids. More usually, the materials are provided so that the UF polymer dispersion is between about 30% and 55% by weight solids. Preferably, the dispersion of UF polymer particles is prepared at about a 40% by weight solids concentration. Under these conditions, the dispersing agent is generally supplied at a concentration of between about 0.1% and 5% by weight, and usually in at least about 0.5% by weight up to about 2% by weight.

The particle size of the UF polymer particulate material may vary fairly widely, but in general is smaller than the size of the aggregate to be coated and usually is substantially smaller than the aggregate material. Producing small UF particles helps one better obtain a necessary degree of adhesion of such particles to the aggregate. Most UF particles will be sufficiently small so as to pass through a 100 mesh (U.S. or Tyler) screen, and generally will have at least a major portion also passing through a 200 mesh screen. Thus, most of the UF polymer particles will be smaller than about 150 microns and a large number of them may be smaller than about 75 microns. While there is virtually no lower limit to the UF polymer particle size for practicing the invention; as a practical matter, most particles will be larger than one micron. Most of the particles, prepared using the procedures and materials noted above, have a particle size in the range of 10 to 80 microns, with a number average particle size between about 25 and 35 microns. A number average particle size of about 30 microns is quite common.

In the broad practice of this invention, the aqueous dispersion of UF polymer particles can be used directly for coating the aggregate material, or the solid UF particles could be isolated from the dispersion before adhering them to the aggregate. Sometimes, it may be easier and more cost effective to use the dispersion directly. However, it is presently preferred to isolate the particles and use them to coat the aggregate material. In the broad practice of the present inevntion, any way for isolating the UF polymer particles from the aqueous UF polymer dispersion can be used. For example, the UF polymer particles in the dispersion may be isolated by filtration and oven drying, or by thin film evaporation. When using these latter techniques, it may then be necessary to reduce the particle size of the recovered solids, for example by grinding, to obtain a desired particle size or size distribution for a specific coating.

Another, often preferred, way of isolating or recovering the UF polymer particles from the UF dispersion formed by the polymerization of urea and formaldehyde as described above, is by spray-drying. As used herein, the terms "spray dryer" and "spray drying" refer to the technically sophisticated process of atomizing (in the form of finely divided droplets) the UF dispersion or slurry into a gas stream (often a heated air stream) under controlled temperature conditions and under specific gas/liquid contacting conditions to effect evaporation of water from the atomized droplets and production of a dry particulate solid product. Spray drying as used herein is typically carried out with pressure nozzles (nozzle atomization) or centrifugal atomizers operating at high speeds (e.g., a spinning disc). Despite the high velocity generation of droplets, a spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried UF powder (e.g., to avoid clumping).

In the practice of this invention, either the aqueous dispersion of slow release nitrogen particles itself, or in most cases the powdered UF polymer, slow release nitrogen, recovered from the aqueous dispersion, is coated onto and bonded onto the aggregate material using a suitable adhesive binder. For purposes of convenience and cost, it may sometimes be preferred to use the dispersion directly, without any intervening processing for isolating the UF particles.

In the broad practice of this invention, the nature of the adhesive binder used to adhere the UF polymer particles to the surface of the aggregate material is not narrowly critical. Any non-toxic, biocompatible adhesive material should be suitable. For the most part, a wide variety of adhesive materials should be suitable for use in connection with the present invention and the present invention should not be and in its broadest scope of application is not intended to be limited to any specific adhesive binder.

Generally, it will be desirable to use an adhesive that provides a tough and hard coating so that the UF polymer particulate solids are not easily eroded from the surface of the coated aggregate material during shipping, storage and handling.

Based on these and other characteristics, adhesive classes which can potentially be used as the adhesive binder in the coating of the present invention are quite broad and include, but are not limited to, urea-formaldehyde resins, melamine-formaldehyde resins, animal hide glues, celluloses including ethyl celluloses, methyl celluloses, hydroxymethyl celluloses, hydroxypropyl celluloses, hydroxymethyl propyl celluloses, carboxy methyl celluloses, polyvinyl alcohols and polyvinyl alcohol copolymers, dextrins, malto-dextrins, alginates, sugars, molasses, polyvinyl pyrrolidones, polyvinyl acetates and polyvinyl acetate copolymers, polysaccharides, fats, oils, proteins, gum arabics, shellacs, vinylidene chlorides, vinylidene chloride copolymers, lignosulfonates, starches, acrylate polymers and copolymers, such as polyvinyl acrylates, zeins, gelatins, chitosan, polyethylene oxide polymers, acrylamide polymers and copolymers, polyhydroxyethyl acrylates, methylacrylamide polymers, polychloroprenes, poly (methyl vinyl ether)-maleic anhydride copolymers, vinylpyrrolidone/ styrene copolymers, vinyl acetate/butyl acrylate copolymers, styrene/acrylic ester copolymers, vinyl acetate/ ethylene copolymers and polyurethane polymers. Crosslinkable silicone materials as described in U.S. Pat. No. 4,753, 035 also can be used. Still other materials, including natural inorganic materials such as silica gel and clay may also be suitable in some applications as will be readily apparent to those skilled in the art.

The preferred adhesive binder is a urea-formaldehyde (UF) resin. UF resins that have commonly been used to bond wood particulates together in forming board products such as waferboard and particleboard have been determined to be particularly suitable. Such UF resins can be used in the form of aqueous solutions/dispersions. Applicants have determined that such resins can be combined directly with the aqueous dispersion of UF polymer particles and the mixture of adhesive resin and polymer dispersion can then be applied to the aggregate material to form the desired coating. Other ways of adhering the UF polymer particles from the dispersion using a UF resin also are possible and are embraced by the present invention.

Some of the factors to consider when selecting an adhesive binder are its viscosity, its rate of cure, or rate of drying, the temperature needed to cure the adhesive and its final moisture content after cure or drying. Some of these factors, such as the cure time and moisture content may also be influenced by other parameters such as whether, what other types and what amounts of particulate material might be used in a final coating. In general, it is desirable to have an adhesive binder, which cures relatively fast. In some cases, however, a binder that cures less quickly may be desired. For example, a binder that does not quickly cure may be preferred if one seeks to adhere particles to the coating after the binder has already been applied to the aggregate material. A binder which cures too quickly might leave insufficient time in the uncured tacky state to add and/or adhere the particulates, such as the UF polymer powder material to the coating, if such a method of coating which relies on surface tackiness is desired. Thus, it may in some cases be preferable for the adhesive binder to have a minimum water content, such that the adhesive binder composition will remain tacky for some minimum period of time after application to the aggregate material.

The amount of the adhesive binder to use with the UF polymer dispersion or the UF polymer particles to form the final coating will be determined by a number of known parameters such as the adhesive type and solids content, the type of aggregate material to be coated, and the thickness of the desired coating, and thus the amount of adhesive may vary widely. As one skilled in the art can appreciate the exact amount of adhesive also will vary depending on the size of the aggregate material to be coated. Often, an amount of adhesive binder will be used which completely coats substantially all available aggregate material surface area. An excess of adhesive generally should be avoided as this may contribute to undesired agglomeration during manufacture. A larger amount of the adhesive may be necessary as larger amounts of UF polymer particulate material, or other particulate material, is to be added to the coating.

In general, the amount of the adhesive in any coating formulation for most applications will be in the range of from 0.01 to 100 parts by weight dry adhesive binder solids per 100 parts by weight of aggregate material, often from 0.1 to 100 parts by weight dry adhesive binder solids per 100 parts by weight of aggregate material, more usually from about 0.01 to 10 parts by weight dry adhesive binder solids per 100 parts by weight of aggregate material, such as from 0.5 to 10, and most often from 0.1 to 7 parts of dry adhesive solids per 100 parts of aggregate material, such as from 1.0 to 7.0.

Usually, on a dry solids basis, the adhesive binder will comprise from about 0.1 to 60% by weight, more often from about 1 to 40% by weight, sometimes from about 0.5 to 20% by weight, or from about 1 to 10% by weight, and sometimes from about 3 to 7% of the total coating weight, with the remainder being other solids, especially the UF polymer particles of the invention.

In addition to the slow release nitrogen, UF polymer solid particles, a variety of other additives, including other agriculturally acceptable particulate materials, may also be bonded to the aggregate material by the adhesive binder component of the coating. While some materials, which exhibit a high degree of water solubility, may be mixed with the UF polymer dispersion or with an aqueous adhesive binder composition prior to its introduction to the coating, or prior to UF particle isolation, such as by spray-drying, for the most part such adjuvants will be introduced into a coating formulation, or during the coating process much like the UF polymer dispersion itself.

Such materials may essentially be any finely divided material commonly used in fertilizer applications. Such particulates may include calcium carbonate (agricultural lime) in its various forms for adding weight and/or raising the pH of acid soils; metal containing compounds and minerals such as gypsum and dolomite, metal silicates and chelates of various micronutrient metals such as iron, zinc and manganese; talc; elemental sulfur; pesticides, herbicides and fungicides to combat or prevent undesired insects, weeds and disease, super absorbent polymers, wicking agents, wetting agents, plant stimulants to accelerate growth, inorganic (N—P—K) type fertilizers, sources of phosphorus, sources of potassium and organic fertilizers, such as manure or urea as a way to deliver more immediately available nitrogen for a quicker initial greening effect. Mixtures of these different particulate materials may of course be employed and the aggregate material may be given multiple coatings with the same or different particulate materials used in different particulate layers.

The most important macronutrients are nitrogen, phosphorus, potassium and calcium but in many instances it may be worthwhile that others also be present in the composition. The more important micronutrients are zinc, iron and manganese, but as with the macronutrients it may be worthwhile in some circumstances that others also be present. Phosphorus can be conveniently added as free phosphoric acid, or as a substituted salt of an inorganic or organic phosphorus-containing acid. Potassium is conveniently added as potassium hydroxide or as a potassium containing salt. In this regard, the disclosure of U.S. Pat. No. 5,797,976, which provides an extensive list of nutrients and other plant growth adjuvants for enhancing the growth and development of plants, is herein incorporated by reference in its entirety for its disclosure.

The amount of particulate material, including especially the UF polymer particles of the invention, added and adhered to the coating may vary fairly widely, but will usually depend on the particular application and the optional presence of other particulates besides the essential UF polymer particles of the present invention. The amount of the adhesive binder used in the coating also is a factor that can influence the amount of particulate UF polymer (or other particulate material) that can be effectively added and adhered to the aggregate material.

In terms of weight amount, a general range is from 0.1 to 1000 parts by weight of UF polymer particles (optionally partially replaced with other particulate additives) per 100 parts by weight of aggregate material to form the coating, and also from 1 to 500 parts per 100 parts. More usually an amount of 0.1 to 300 parts by weight, such as 1 to 300 parts by weight and most often an amount of 0.1 to 200 parts by weight, such as 1 to 200 parts, or 10 to 200 parts by weight of UF polymer particles (optionally partially replaced with other particulate additives) all per 100 parts by weight of aggregate material, will be used.

It is not necessary that the amount of particulate UF polymer material be at a level sufficient to satisfy the full adherence capacity of the adhesive coating and minor amounts of from about 0.1 to less than 10 parts, such as from 3 to less than 10 parts of particulate UF polymer material may be used per 100 parts aggregate in some cases depending upon the nitrogen requirement of the plant in which the aggregate will be placed in close proximity.

The particulate slow release nitrogen solids and any additional adjuvants are then attached to the aggregate material using the adhesive binder coating component.

A variety of procedures, both batch and continuous in operation, can be used to provide the coating of the slow release nitrogen UF polymers particulate solids on the aggregate material. Aggregate may be coated in a single step, or by a multi-stage process. The present invention is not to be limited to any particular technique. The aggregate material and the coating constituents can be mixed in any of the variety of commercially available coating equipment such as equipment commercially available from SATEC of Elmshorn, Germany. Alternatively, see, for example, continuous coating machines described in U.S. Pat. No. 5,494,709 and U.S. Pat. No. 5,443,637 assigned to Coating Machinery Systems (CMS), a subsidiary of Vector Corporation. Use of a standard paddle type sand muller has proven entirely acceptable.

In one approach, the adhesive binder can be applied to the aggregate by spraying in a first stage followed by a second stage in which the slow release nitrogen UF polymer particulate solids, along with any other particulate additives, are applied by dusting and attached by the adhesive binder. Each stage may consist of a shallow fluidized bed of aggregate on a horizontally moving conveyor. The drying, or curing rate of the adhesive coating is manipulated so that the solid nitrogen UF polymer particulates suitably adhere to the aggregate material, while avoiding excessive agglomeration during the coating process.

Another suitable coating procedure is illustrated in U.S. Pat. No. 2,648,609, and in U.S. Pat. No. 3,911,183 and may be useful for aggregate material of lower densities, wherein an air stream is moved in a confined space upwardly past the aggregate material with a force sufficient to suspend (fluidize) it continuously. A coating fluid (mixture of adhesive binder and UF polymer dispersion) in the form of an atomized mist is introduced into the gas, e.g., air stream prior to its contact with the aggregate. By heating the air stream, the coating applied to the aggregate can be dried quickly. In this regard, heated air can be forced through the aggregate using a blower to maintain the fluidized bed at a desired temperature, such as from about 80° to 250° F. (25° to 121° C.). The coating fluid is atomized through a spraying nozzle and is deposited on the aggregate in thin layers, which dry quickly under the influence of the hot gas, e.g., air. The desired amount of coating can be obtained by applying a plurality of thin, consecutive layers of the coating material. The particulate solids, including the essential UF polymer particulates are preferably introduced as a dispersion in admixture with the adhesive binder and in other cases may be introduced into the coating zone as a solid particulate with the aggregate through a separate stream.

Another available coating procedure uses a rotary drum, such as a tilted drum. The aggregate is tumbled within the drum while a coating formulation of an admixture of the adhesive binder and the UF polymer dispersion is sprayed onto the agitated aggregate. Usually, a stream of hot gas, e.g., air is directed at the aggregate material to facilitate rapid drying and curing of the coating. The inlet air temperature and the feed rate of the coating formulation can be controlled to optimize formation of the coated aggregate. Again, the dispersion of the particulate UF polymer solids is preferably introduced in admixture with the adhesive or can be introduced as a separate stream of solids with the aggregate itself.

Generally, in many of these coating embodiments, it is important that the temperature not be significantly below about 80° F. (about 27° F.). At lower temperatures, aqueous adhesive coatings may not dry fast enough to prevent the coated aggregate material from agglomerating. A suitable temperature for performing any particular coating operation may be determined by a simple preliminary experiment taking into account the particular aggregate to be coated and the adhesive binder material to be used. Other coating processes and parameters will be readily apparent to those skilled in the art and the present invention is not to be limited to any specific technique.

Generally, a sufficient amount of the particulate UF polymer material for the coating, supplied either as a dispersion or as dry solids, is most often from about 1 to about 200, or from about 10 to 200 parts by weight of UF polymer powder per 100 parts by weight of the originally uncoated aggregate material.

The present invention is useful for coating a wide variety of aggregate materials as a way of providing a slow (extended) release source of nitrogen fertilizer to plants growing in proximity to the aggregate.

A coloring agent also may optionally be added to the coating formulation to make the aggregate easier to see and/or to improve its appearance in a particular application. For example, in the case of sand used for filling in divots on a golf course, the coated sand is preferably colored green to allow it to blend into the green of the fairway. The colorants can be either organic or inorganic and should be non-toxic. Examples of organic colorants are azo dyestuffs and phthalocyanine blues and greens. Examples of inorganic colorants are titanium dioxide (white) or ochers (yellow) and iron oxides (red). The colorant may be a dye and can be selected from the group of acetate dyes, anthraquinone dyes, acid dyes or azo dyes. Specific examples of acceptable coloring agents include Millikin's Liquitint green and the dyes, green #7 and red #48. These dyes are commercially available from dye manufacturers and are well known to those of ordinary skill in the art. The dye may comprise from about 0.5% to about 10% w/w of the coating. Generally, the amount of coloring agent is between about 1–2%.

Other coating additives include surfactants, initiators, stabilizers, cross linkers, antioxidants, UV stabilizers, reducing agents, colorants and plasticizers.

The thickness of the final coating will vary with the type of aggregate material, the desired loading of the UF polymer particles (and other solids) and the amount of adhesive binder. Usually, the coating thickness will range between about 10 to 1000 microns, most often between about 20 to 500 microns.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

EXAMPLE 1

A urea-formaldehyde (UF) dispersion, suitable for producing UF polymer particles used in making the coated aggregate material of the present invention, is prepared as follows. Water (32.3 parts by weight) and a 50% aqueous solution of formaldehyde (31.8 parts by weight) are added to a reaction vessel equipped with vacuum reflux, a heater and a mixer. While adjusting the temperature of the agitated aqueous mixture to 100° F., its pH is also adjusted to about 7.0 (6.8 to 7.2) using either 50% caustic (NaOH), or 35% sulfuric acid, as needed. Once the aqueous mixture has been heated to 100° F. (about 38° C.), 31.8 parts by weight of prilled urea also is added and mixing is continued. The temperature of the agitated aqueous mixture then is increased to 120° F. (about 50° C.) and held for a time (usually about 15 minutes) sufficient to dissolve the urea. While maintaining the temperature of the agitated mixture at 120° F. (about 50° C.), the pH is adjusted to within the range of 8.0 to 8.4, again using either 50% caustic (NaOH), or 35% sulfuric acid as needed. Using, as appropriate, a combination of the reaction exotherm and external heating, the reaction mixture is heated to a temperature of 158° F. and the temperature is controlled using vacuum reflux. The pH of the mixture is adjusted, as needed, to about 7.8 to 8.2, using either 50% caustic (NaOH), or 35% sulfuric acid. The agitated mixture is held at a temperature of about 158° F. (70° C.) for about 30 minutes and the pH continues to be adjusted, as needed, to about 7.8 to 8.2, using either 50% caustic (NaOH), or 35% sulfuric acid so that the reactants form methylol ureas. While continuing agitation, the aqueous mixture is cooled to about 105° F. (about 40° C.) and a dispersant (one part by weight of DAXAD 19) is added while the batch is cooled. Upon reaching 105° F. (about 40° C.), the batch is placed under full vacuum. While maintaining full vacuum and applying cooling to the agitated batch, the pH of the aqueous mixture is adjusted, as quickly as possible, to a pH of about 3.3 to 3.5, using 35% sulfuric acid, at which point the batch may exotherm to a temperature of above 175° F. (about 80° C.) before the exotherm subsides. This procedure causes rapid condensation of the methylol ureas to a solid network polymer. After completing the pH adjustment, the temperature of the aqueous mixture is cooled to 105° F. (about 40° C.) as quickly as possible while it is held for 20 minutes. Following the 20 minute holding period, the pH of the aqueous mixture is adjusted to 6.5 to 7.5, using either 50% caustic (NaOH), or 35% sulfuric acid, as needed, and then is discharged to storage. The UF polymer dispersion at about 38 wt. % solids should be agitated during its storage.

EXAMPLE 2

The dispersion made in accordance with Example 1 can be spray dried to produce UF polymer particles suitable for use in coating an aggregate material in accordance with the present invention. A Niro P6 spray dryer can be fed with 15 pounds per hour of the dispersion of Example 1. The spray dryer receives an inlet gas stream at a flow rate of about 415 standard cubic feet per minute and a temperature of 330–340° F. (165–170° C.). The outlet temperature of the spray dryer was measured as 75–95° F. (25–35° C.). The recovered UF polymer particle product (at about 1 wt. % moisture) had particle sizes distributed from 10 to 80 microns, with a number average size of 30 microns.

EXAMPLE 3

This example describes the preparation of a UF resin (final F:U mole ratio of about 1.12:1) suitable for use as an adhesive in accordance with the present invention.

An aqueous solution of 50% by weight formaldehyde (41.2 parts by weight) is added to a reaction vessel equipped with vacuum reflux, a heater and a mixer. Then, a urea formaldehyde concentrate, UFC 85, (7.8 parts by weight) and a small amount of additional water (0.25 parts by weight) are added with mixing to establish an aqueous reaction medium. A small amount of an 85 weight percent aqueous solution of triethanolamine (0.05 part by weight) is added, the temperature is adjusted to about 54° C. and sufficient caustic (50% aqueous NaOH) is added to establish a pH of about 7.7 to 7.9. At this point, urea then is added (23.3 parts by weight) and the ensuing exothermic reaction causes the temperature to increase. Caustic is added as needed to maintain the pH above about 6.8.

Once the temperature has reached a constant, the reaction mixture is heated to reflux and held at reflux (about 98° C.) for about 20 minutes. Caustic is added as needed to maintain the pH under alkaline conditions above about 6.8. The reaction mixture then is cooled to a temperature of about 95–97° C. and formic acid (23% by weight aqueous solution) is used to reduce the pH to about 5.2 to 5.4. If pH drops too much, it should be adjusted with caustic. The reaction is allowed to continue under these conditions until a viscosity of about "K" on the Gardner scale is projected. Then, the reaction mixture is cooled to 80° C. and the pH is adjusted with caustic to about 6.0. At this point, additional urea is added (3.5 parts by weight) and the ensuing reaction is allowed to proceed until a viscosity of about "R-S" on the Gardner scale is projected. It is preferred to adjust the temperature, upwardly or downwardly, so that the viscosity advancement takes about 45 to 60 minutes. As the reaction mixture is cooled to 67–70° C., the pH is adjusted to 7.0. Further amounts of urea (14.6 parts by weight) and UFC 85 (4.2 parts by weight) are added and the temperature is adjusted to 55° C. and is held there for 20 minutes. One additional charge of urea is added (5.2 parts by weight) and the batch is cooled quickly to 46° C. and the pH is adjusted to about 7–7.4 and then cooled to ambient (about 22–27° C.) to yield a resin at about 60 wt. % solids.

EXAMPLE 4

A green coated sand is prepared as follows: 20/40 frac sand (3000 g) is added to a muller and heated to about 149°

C.; the UF polymer dispersion of Example 1 (219 g) is added along with a green dye (10 g) and mixed for about 15 seconds. Then, the UF adhesive binder resin of Example 3 is added (45 g) and the material is mixed until free-flowing.

EXAMPLE 5

A green coated sand is prepared as follows: 20/40 frac sand (3000 g) is added to a muller and heated to about 177° C.; UF polymer particle (84 g) of Example 2 is added and mulled for 5 seconds. Then, the UF adhesive binder resin of Example 3 is added (46 g) and the material is mixed for 30 seconds followed by a green dye (10 g) and 100 ml of water. The final mixture being mulled until free-flowing.

EXAMPLE 6

Using a Niro industrial-sized spray dryer (ON 030-5051), a UF polymer dispersion made in accordance with Example 1 having a solids content of about 38 wt. %, at a temperature of 28° C. and at a feed rate of 100 lbs/minute was spray-dried with the atomizer wheel operating at 13,000 RPMs. Air, at a flow rate of 49,400 standard cubic feet per minute and at a temperature of 186° C. was delivered to the spray dryer. The outlet air temperature measured as 88° C. Spray-dried UP polymer particles were recovered from the spray dryer.

EXAMPLE 7

Coated sand is made by heating 1600 pounds of sand in an oven to a temperature in the range of 225°–300° F. (about 110° to 150° C.), and the heated sand is then fed into a 2000 pound capacity paddle type sand muller. The UF powder of Example 6 (14.5 pounds) and the adhesive resin of Example 3 (12.1 pounds of 60 wt. % solids solution) are immediately added. The components are mixed for 2 to 3 minutes during which time the mix achieves a doughy consistency. As the mixture gradually cools during mixing, the dough-like material breaks into individual granules of sand, with the powder cured onto the sand with the adhesive as the coating. The coated sand then is discharged from the bottom of the muller onto a cooling pile.

EXAMPLE 8

In order to assess the release performance of the UF powder used to prepare the coated sand of the present invention, the sprayed dried UF powder product of Example 6 was tested in an incubation lysimeter, a procedure developed by Dr. Jerry Sartain of the University of Florida. An individual lysimeter is simply a 12 inch long piece of 3" diameter PVC piping. The pipe has a permanent cap on the bottom and a removable cap on the top. The bottom cap has an opening where water can drain and vacuum can be applied to remove excess water. A sand-soil mixture is prepared by mixing ninety-five (95) parts sand and five (5) parts topsoil. An amount of the sand-topsoil mixture sufficient to fill the column then is mixed thoroughly with an amount of each of the fertilizers to be tested sufficient to provide 450 mg of nitrogen in the column. After filling the lysimeter column, enough water is added to moisten the column contents. The column then is ready for the start of the testing. Once a month, 500 milliliters of 0.01M citric acid is added to the column, allowed to flow downwardly through the column, and is collected from the bottom drain. Any excess water (citric acid) is removed from the column using a vacuum and combined with the amount collected from the drain. The collected liquid is analyzed for nitrogen (nitrate and ammonia) content. The amount of nitrogen (nitrate and ammonia) eluted from the column each month is determined. In addition to the UF powder of Example 6, sulfur coated urea (SCU), a polymer coated urea (Poly-On), a low molecular weight methylene urea (Nitroform) and an even lower molecular weight methylene urea (Nutralene) also were tested. Each material was tested in triplicate and the results of the testing are illustrated in the sole FIGURE. The graph of the sole FIGURE plots the total nitrate released each month (average of three replicates) over a six month period of time. As shown, the UF powder had the lowest level released in the first month and then sustained the highest levels of release in the fourth, fifth and sixth months. Furthermore, as shown by the release curve in FIG. 1, the release rate of nitrogen (as nitrate) from the UF polymer particles of the present invention is substantially uniform (constant) over a period of six months.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

What is claimed is:

1. A coated aggregate material for placing in proximity to a plant, the aggregate having an adherent coating thereon comprising an adhesive binder and a particulate urea-formaldehyde polymer.

2. The coated aggregate of claim 1 wherein the particulate urea-formaldehyde polymer is made by acidifying a aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

3. The coated aggregate of claim 2 wherein the adhesive binder is applied in admixture with an aqueous dispersion of the particulate urea-formaldehyde polymer to the aggregate and dried.

4. The coated aggregate of claim 3 wherein the adhesive binder is a urea-formaldehyde resin.

5. The coated aggregate of claim 2 wherein the aqueous methylol urea solution is made by reacting urea and formaldehyde at a urea:formaldehyde mole ratio of approximately 1:1.

6. The coated aggregate of claim 5 wherein the aqueous methylol urea solution is made by reacting urea and formaldehyde at a urea:formaldehyde mole ratio of 0.83:1 to 1.1:1.

7. The coated aggregate of claim 2 wherein the aqueous methylol urea solution is made by reacting urea and formaldehyde at a urea:formaldehyde mole ratio of 0.95:1 to 1.05:1.

8. The coated aggregate of claim 2 wherein the aqueous methylol urea solution is made by reacting urea and formaldehyde at a urea:formaldehyde mole ratio of 0.95:1 to 1.05:1 and wherein the methylol urea solution contains a dispersing agent during the acidifying.

9. The coated aggregate of claim 1, 2, 5, 7 or 8 wherein the aggregate is selected from sand, granular fertilizers, wood bark, wood chips, sawdust, marble chips and particulate natural nitrogenous materials.

10. The coated aggregate of claim 9 wherein said coating has an additional adjuvant selected from calcium carbonate;

gypsum; metal silicates; metal chelates of a metal selected from iron, zinc and manganese; talc; elemental sulfur; activated carbon; pesticides; herbicides; fungicides; super absorbent polymers; wicking agents; wetting agents; plant stimulants; urea, sources of phosphorus, sources of potassium and inorganic fertilizers.

11. The coated aggregate of claim 7 or 8 wherein the particulate urea-formaldehyde polymer is provided in an amount to result in a release of nitrogen at a rate consistent with the growth rate of the plant.

12. The coated aggregate of claim 9 having particulate urea-formaldehyde polymer particles containing about 36% nitrogen.

13. A method of enhancing the growth and development of a plant comprising providing in the proximity of said plant a coated aggregate material having an adherent coating thereon comprising an adhesive binder and a particulate urea-formaldehyde polymer.

14. The method of claim 13 wherein the particulate urea-formaldehyde polymer is made by acidifying a aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

15. The method of claim 14 wherein the adhesive binder is applied in admixture with an aqueous dispersion of the particulate urea-formaldehyde polymer to the aggregate and dried.

16. The method of claim 14 wherein the aqueous methylol urea solution is made by reacting urea and formaldehyde at a urea:formaldehyde mole ratio of approximately 1:1.

17. The method of claim 16 wherein the aqueous methylol urea solution is made by reacting urea and formaldehyde at a urea:formaldehyde mole ratio of 0.83:1 to 1.1:1.

18. The method of claim 14 wherein the aqueous methylol urea solution is made by reacting urea and formaldehyde at a urea:formaldehyde mole ratio of 0.95:1 to 1.05:1.

19. The method of claim 14 wherein the aqueous methylol urea solution is made by reacting urea and formaldehyde at a urea:formaldehyde mole ratio of 0.95:1 to 1.05:1 and wherein the methylol urea solution contains a dispersing agent during the acidifying.

20. The method of claim 13, 14, 16, 18 or 19 wherein the aggregate is selected from sand, granular fertilizers, wood bark, wood chips, sawdust, marble chips and particulate natural nitrogenous materials.

21. The method of claim 20 wherein said coating has an additional adjuvant selected from calcium carbonate; gypsum; metal silicates; metal chelates of a metal selected from iron, zinc and manganese; talc; elemental sulfur; activated carbon; pesticides; herbicides; fungicides; super absorbent polymers; wicking agents; wetting agents; plant stimulants; urea, sources of potassium, sources of phosphorus and inorganic fertilizers.

22. The method of claim 21 wherein the particulate urea-formaldehyde polymer is provided in an amount to result in a release of nitrogen at a rate consistent with the growth rate of the plant.

23. The method of claim 22 wherein the particulate urea-formaldehyde polymer particles contain about 36% nitrogen.

* * * * *